(12) United States Patent
Flon et al.

(10) Patent No.: US 8,390,676 B2
(45) Date of Patent: Mar. 5, 2013

(54) DEVICE AND METHOD FOR TRACKING A VIEWER WINDOW

(75) Inventors: Stanislas Flon, Dresden (DE); Philippe Renaud-Goud, Troyes (FR)

(73) Assignee: SeeReal Technologies S.A., Munsback (LU)

( * ) Notice: Subject to any disclaimer, the term of this patent is extended or adjusted under 35 U.S.C. 154(b) by 871 days.

(21) Appl. No.: 12/440,080

(22) PCT Filed: Aug. 24, 2007

(86) PCT No.: PCT/EP2007/058838
§ 371 (c)(1),
(2), (4) Date: Aug. 14, 2009

(87) PCT Pub. No.: WO2008/028829
PCT Pub. Date: Mar. 13, 2008

(65) Prior Publication Data
US 2010/0045781 A1    Feb. 25, 2010

(30) Foreign Application Priority Data
Sep. 5, 2006 (DE) .......................... 10 2006 041 637

(51) Int. Cl.
*H04N 13/04* (2006.01)
(52) U.S. Cl. ............... 348/51; 359/29; 359/35; 359/237
(58) Field of Classification Search .................. None
See application file for complete search history.

(56) References Cited

U.S. PATENT DOCUMENTS

| | | | |
|---|---|---|---|
| 2001/0006426 A1* | 7/2001 | Son et al. | 359/15 |
| 2002/0126331 A1* | 9/2002 | Orr et al. | 359/15 |
| 2004/0179252 A1* | 9/2004 | Tsukagoshi | 359/3 |
| 2005/0117016 A1* | 6/2005 | Surman | 348/51 |

FOREIGN PATENT DOCUMENTS
| | | |
|---|---|---|
| DE | 10 2004 044111 | 3/2006 |
| JP | 09-068674 | 3/1997 |

OTHER PUBLICATIONS

Boerner R: "Vier Autostereoskopische 1-3,6,7, Einpersonen-Monitore Mit 9,11 Trackingssystemen" FKT Fernseh Uno Kinotechnik, Fachverlag Schiele & Schon GMBH. , Berlin, DE, Bd. 52, Nr. 12, Dec. 1998, Seiten 747-751, XPOO0880813 ISSN: 1430-9947.

(Continued)

*Primary Examiner* — Moustafa M Meky
*Assistant Examiner* — Clayton R Williams
(74) *Attorney, Agent, or Firm* — Saul Ewing LLP (57) ABSTRACT

The invention relates to a method and a playback device for a two- and/or three-dimensional illustration, having at least one light source, at least one light modulation device, a display screen, and a tracking system for tracking a virtual viewer window of a viewer plane, in which at least one viewer is located. This tracking system has a position detection system for determining the eye positions of the at least one viewer in the viewer plane, a tracking device, and a control device for activating and controlling the tracking device, and is disposed between the light modulation device and the display screen. In order to track the viewer window along an optical axis of the playback device, a focal width on the image side of an optical system of the tracking device is constant.

15 Claims, 6 Drawing Sheets

OTHER PUBLICATIONS

Tomono A et al: "Optical Design for a Large-Screen Stereoscopic Display System With Extended Observalble Space" Electronics & Communications in Japan, Part II—Electronics, Wiley, Hoboken, NJ, US, Bd. 76, Nr. 11, Nov. 1, 1993, Seiten 43-57, XP000438328 ISSN: 8756-663X.

Pastoor S et al: "3-D displays: A review of current technologies" Displays, Elsevier Science Publishers BV., Barking, GB, Bd. 17, Nr. 2, Apr. 1, 1997, Seiten 100-110, XP004068287 ISSN: 0141-9382.

* cited by examiner

DEVICE AND METHOD FOR TRACKING A VIEWER WINDOW

The present invention relates to a display device for a two- and/or three-dimensional presentation comprising at least one light source and at least one light modulator device. Further, the invention relates to a method for tracking at least one virtual observer window in an observer plane, where at least one observer is situated.

The invention can be applied in display devices which are used to present three-dimensional objects to one or multiple observers, in particular holographic display devices. However, the invention may also be used in autostereoscopic display devices.

Prior art publications describe holographic display devices with light modulator devices, where the Fourier transform of a hologram is imaged on to the eye pupil of an observer. The exit pupil of those display devices thus coincides with the eye pupil of the eye and is referred to as an observer window. A final optical element, seen in the direction of light propagation, in the display device in front of the observer is referred to as a screen. It is assumed that the screen is a focusing optical element.

If in a holographic display device the observer window coincides with the eye pupil, the observer can watch a reconstructed scene of an object in a reconstruction volume, which stretches between the observer window and the screen. However, if the observer moves sideways or along the optical axis of the display device, the observer window will no longer coincide with the observer's eye pupil. This leads to a vignetting of the reconstructed scene, which can thus only be watched in parts or not at all.

According to prior art solutions, in order to prevent such vignetting of the reconstructed scene if the observer moves laterally, position detection systems may be used which detect the position of the observer eyes. With the help of a tracking unit, the observer window is tracked to the observer eye if the observer moves to another position. The observer window is then tracked laterally in the observer plane. There are several prior art solutions for this. However, tracking the observer window along the optical axis of the display device, i.e. towards the screen or away from it, requires a different approach than for lateral tracking. It must be ensured that the observer window will be moved along the optical axis, because otherwise the reconstructed scene will be vignetted. In addition, the image of the light modulator device must always be imaged on to the screen in the same way and without any changes, irrespective of the distance between the observer and a screen. This means that the image of the light modulator device, which is for example localised on the screen for an observer position a, must be identical on the screen for an observer position b.

One possibility for tracking is described in the Patent Abstracts of Japan No. 09068674, including the associated Figures. Therein, an electro-holographic display for the presentation of a three-dimensional scene with the help of two spatial light modulators is disclosed, which features a tilted mirror element for the projection of the light from the light modulators on to the observer eyes. Each light modulator with the corresponding hologram is intended for one observer eye. The three-dimensional scene is reconstructed in the area around or on the tilted mirror element. Any observer movement is detected by a position detection system and the tilted mirror element is turned around its horizontal or vertical axis so as to follow the new position of the observer eye. At the same time, the view of the three-dimensional scene that corresponds with the new observer position is shown in the holograms. Further, in addition to a lateral tracking of the light, a tracking along an optical axis of the display is disclosed in the Figures. The light is tracked towards the three-dimensional scene or away from it, according to a new position of the observer eyes. Such tracking is achieved by modifying a lateral distance among the two light modulators. Thereby it is achieved that the light which is intended for one eye also falls on to that eye. According to the position of an observer eye, where the new eye position is detected with the help of the position detection system, the light modulators are displaced laterally in relation to one another, whereby the light can be tracked along the optical axis, so that the reconstructed scene is always visible for the observer eyes.

If that kind of tracking is used, the problem of vignetting is not an issue because the reconstructed scene is very small. If a larger reconstructed scene is desired, as is the case in the present invention, such a method cannot be used. Moreover, according to JP 09068674 no observer window is formed, which would have to be tracked, but the entire visibility region is tracked. The pupil of the system does not coincide with the eye pupil, but lies between the eye and the reconstructed scene.

It is therefore the object of the present invention to provide a method and device for tracking a virtual observer window in a display device for three-dimensional presentation if an observer moves to another position, in particular along an optical axis of the display device, said method and device allowing to track the observer window easily and conveniently.

The object of the invention has been achieved by the features of claims 1 and 7.

The object has been achieved as claimed in claim 1 for a display device for a two- and/or three-dimensional presentation for tracking a virtual observer window using the following means. The display device according to the invention comprises at least one light source, at least one light modulator device, a screen and a device for tracking a virtual observer window of an observer plane in which at least one observer is situated. This device comprises a position detection system used to detect eye positions of the at least one observer in the observer plane, a tracking unit and a control unit for activating and controlling the tracking unit, wherein the device is disposed between the light modulator device and the screen. According to this invention, an image-side principal plane and an image-side focal length of an optical system of the tracking unit remain constant when tracking the observer window along an optical axis of the display device.

However, tracking the observer window for at least one observer along the optical axis, i.e. tracking the observer window towards the screen or away from it, can be achieved with the help of this device while vignetting of the three-dimensional presentation is prevented. The device allows tracking the observer window easily and conveniently, with minimal means. In addition, the three-dimensional presentation is seen unchanged from any position behind the screen, seen in the direction of light propagation, in which the observer is situated. If the observer moves, he can watch the three-dimensional presentation like in reality. This allows watching the realistic three-dimensional scene in a relaxed manner, under normal strain on the eyes and brain. Thanks to the device according to the invention it is possible to implement optimally the novel method according to claim 7.

Further, according to the present invention, the object has been achieved as claimed in claim 7 for a method for tracking at least one virtual observer window. It proceeds as follows, where at least one observer is situated in an observer plane. In the case of a position change of the observer, a position detection system detects or records the positions of observer eyes in the observer plane, and the detected new observer eye position values are supplied or transmitted to a control unit. The control unit thereupon activates a tracking unit in the display device. The tracking unit is disposed in front of an optical element which functions as a screen, seen in the direction of light propagation. Once the new observer eye position is determined, the tracking unit tracks by way of controlling with the help of the control unit the at least one virtual observer window along an optical axis of the display device according to the observer eye position. The observer window is tracked such that an image-side principal plane of an optical system of the tracking unit and an image-side focal length of the optical system of the tracking unit remain constant and unchanged.

According to this invention, tracking is performed along the optical axis of the display device, where of course also the observer plane is thereby shifted along the optical axis. A lateral tracking of the observer window is not intended according to this invention. However, it is of course also possible in the display device to effect a lateral tracking in addition to the axial tracking. Methods for lateral tracking of the observer window are known from prior art documents. This is why a lateral tracking of the observer window will be omitted here.

The method is of great advantage because it prevents a vignetting of the three-dimensional presentation, in particular of a reconstructed scene, through the observer window, so that the observer can watch the three-dimensional scene without limitations even if he moves towards or away from it, because the exit pupil of the whole system will always coincide with the eye pupil. In addition, the three-dimensional presentation is seen unchanged from any position behind the screen, seen in the direction of light propagation, in which the observer is situated. If the observer moves, he can watch the three-dimensional presentation like in reality. This allows to watch the realistic three-dimensional scene in a relaxed manner, under normal strain on the eyes and brain.

It is particularly preferable if for tracking of the observer window the properties of the tracking unit are changed such that an object-side principal plane of the optical system of the tracking unit is displaced along an optical axis. This may be effected by changing the focal length of optical elements in the tracking unit or by changing the distance between the individual optical elements. However, it is also possible that for tracking the observer window at least one light modulator device in combination with an optical element in the display device is displaced along the optical axis.

If elements in front of the tracking unit or the object-side principal plane of the whole system of the tracking unit are displaced along the optical axis, the imaging on the screen is preferably not disturbed, because the bundle of rays is collimated in front of the tracking unit, seen in the direction of light propagation. However, such displacement leads to a displacement of the exit pupil of the display device along its optical axis according to the observer eye position.

According to another preferred embodiment of the invention, it may be provided that a spatial frequency filter, which is disposed in a Fourier plane of the display device, transmits a selected periodicity interval of the Fourier spectrum of a hologram.

In a preferred use of the tracking unit in a holographic display device with a light modulator device which comprises a hologram, a spatial frequency filter, in particular an aperture, is of major importance, because one- or two-dimensional holograms, which are encoded in pixels, where the pixels are arranged in a regular pattern, generate a periodic continuation of the Fourier spectrum in the Fourier plane. In order to suppress or eliminate the periodicity, a spatial frequency filter can preferably be arranged in that plane (Fourier plane) which only transmits the diffraction order used.

Other embodiments of the invention are defined by the other dependent claims. Embodiments of the present invention are explained in detail below and illustrated in conjunction with the accompanying drawings. The principle of the invention will be explained based on a holographic display device with monochromatic coherent light. It will appear to those skilled in the art that this invention may be applied as well to colour holographic reconstructions or other applications in optics.

Various display devices, in particular holographic display devices, image the generated Fourier transform FT in the course of the reconstruction on to the eye pupil of an observer. The exit pupil of such display devices then lies on the observer eye pupil and is also referred to as an observer window. To be able to watch a reconstructed scene it is therefore necessary for the eye pupil to coincide with the virtual observer window. If this is not the case the reconstructed scene will be vignetted when it is observed. Of course, this is not desired.

Figure 1:
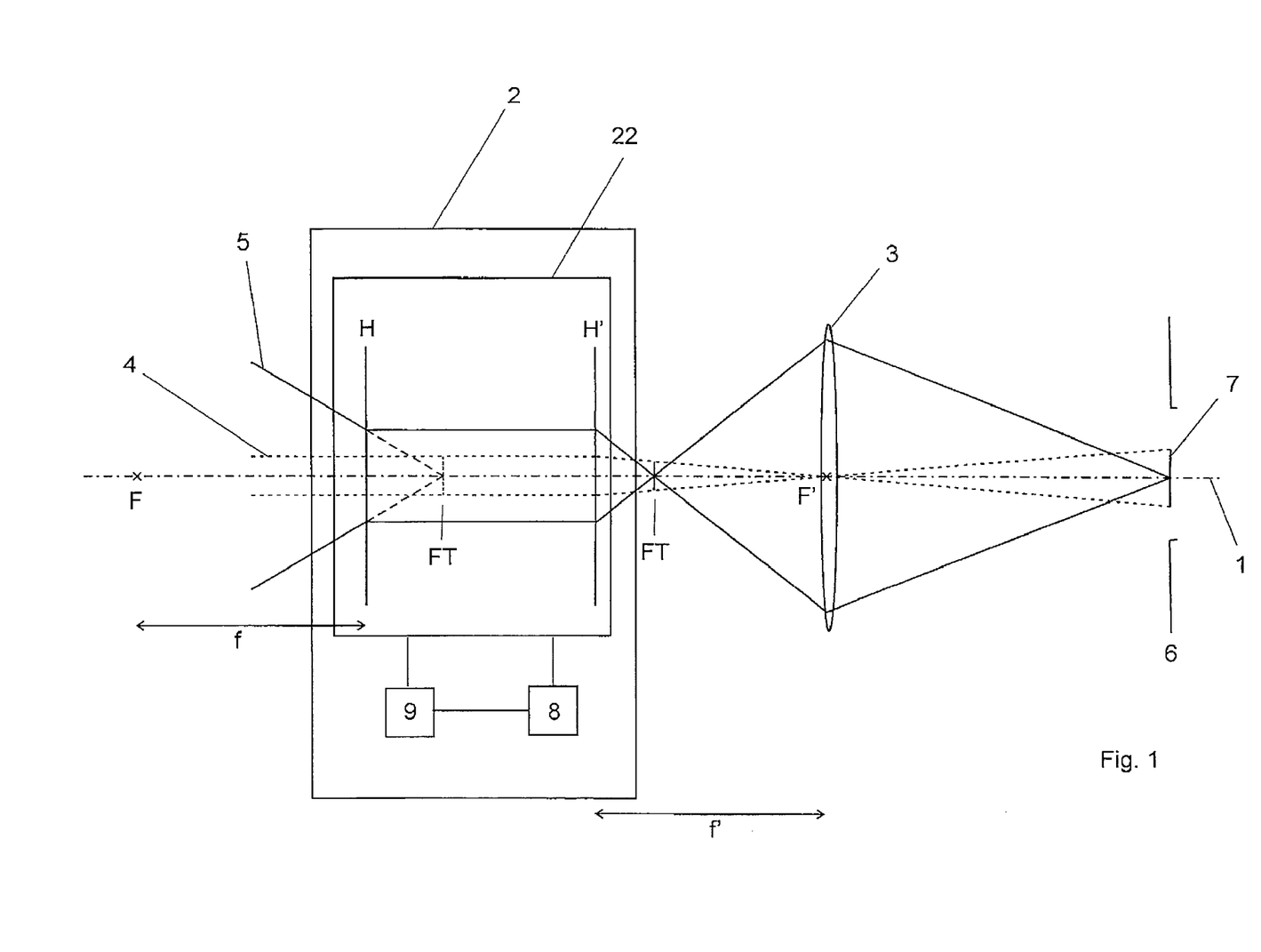
FIG. 1 illustrates the functional principle of the device according to the invention for tracking an observer window in a holographic display device.

This is why it is necessary for the observer window to follow the observer eye. A device for tracking an observer window is thus proposed. The observer window is therein tracked along an optical axis 1 of a display device (axial tracking). FIG. 1 and the following Figures only show a detail of the display device, namely a device 2 for tracking the observer window, said device comprising a tracking unit 22 in combination with an optical element 3 which serves as a screen, and which is referred to as a screen below. The tracking unit 22 comprises at least two optical elements, for example lenses and/or mirrors, preferably three optical elements, which, however, are not shown in this embodiment. The Figure only shows the two principal planes H and H' of the whole system of the tracking unit 22. The tracking unit 22 has an object-side focal length f and an image-side focal length f', and the screen 3 is disposed in the image-side focal plane. At least one light modulator device, not shown, which comprises a hologram, is disposed in front of the tracking unit 22, seen in the direction of light propagation, in the holographic display device. The light modulator device therein modulates the light incident on it, whereupon a scene is reconstructed with the help of optical elements, most of which are not shown here. An image of the light modulator device is generated in front of the tracking unit 22, seen in the direction of light propagation, in the course of the reconstruction of the preferably three-dimensional scene, where a collimated bundle of rays falls from said image on to the tracking unit 22. The optical path 4 of the collimated bundle of rays is indicated by a broken line. The image of the light modulator device is then imaged on to the screen 3. During the reconstruction, a Fourier transform FT is generated at the same time the image of the light modulator device is formed. The Fourier transform is therein also imaged by the optical elements in the display device. The last imaging of the multiple imagings of the Fourier transform FT is through the screen 3 into an observer plane 6, thereby forming an observer window 7 in said observer plane 6. An optical path relating to the Fourier transform FT is given the numeral 5 and indicated by solid lines.

In addition, the device for tracking the observer window 7 comprises a position detection system 8 to detect observer eye positions in the observer plane 6. The position detection system 8 is combined with the tracking unit 22. The values which define the observer eye positions, which are detected by the position detection system, are supplied to a control unit 9, which activates and controls the tracking unit 22 such that the observer window 7 can be tracked along the optical axis 1 of the display device as the observer changes his position. The observer plane 6 is thereby also displaced along the optical axis 1.

Figure 2:
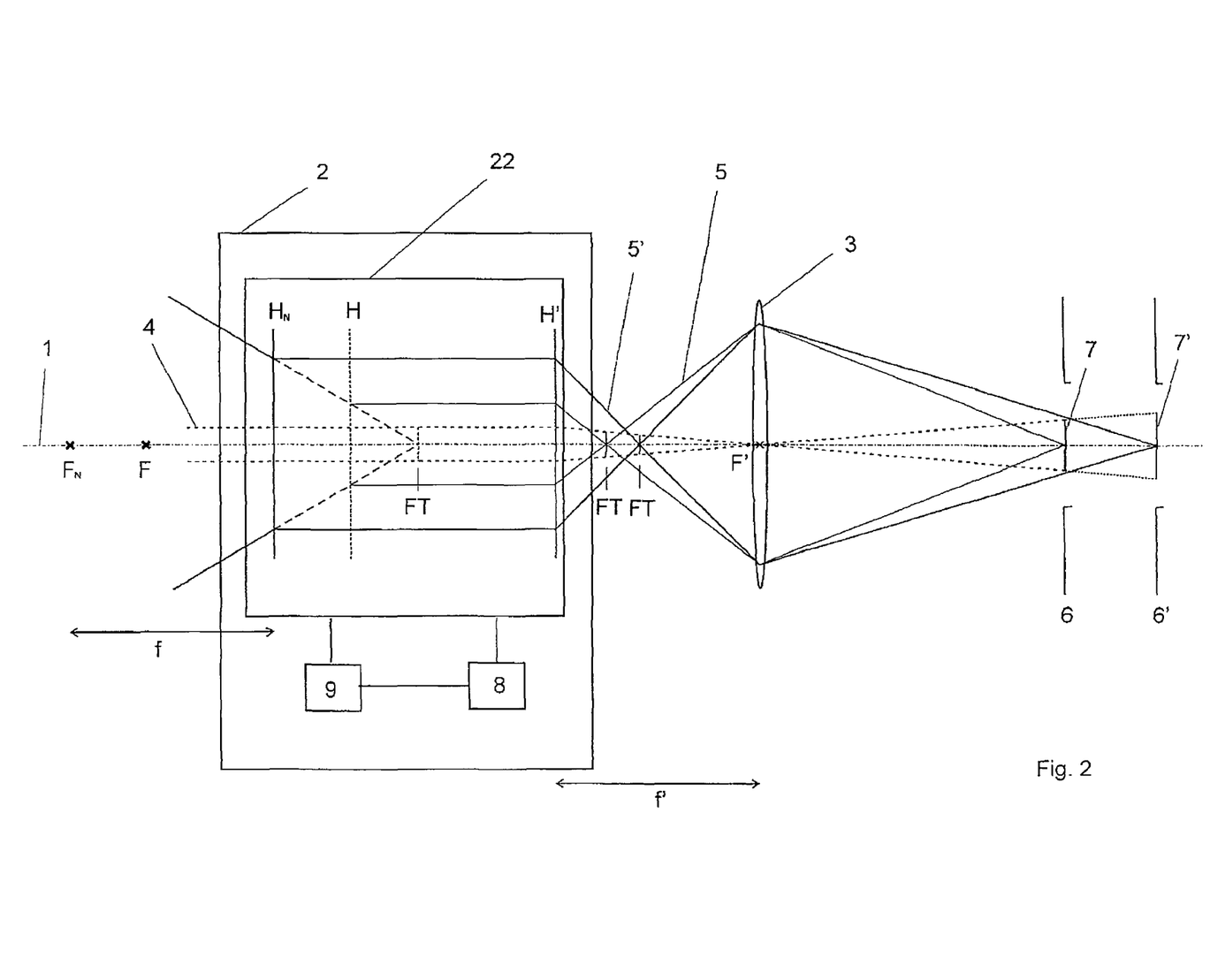
FIG. 2 illustrates the functional principle of the display device according to FIG. 1 when tracking the observer window.

One possibility of tracking the observer window 7 along the optical axis 1 is shown in FIG. 2. The idea according to this invention is that the object-side principal plane H of an optical system or of the whole system of the tracking unit 22 is axially displaced to a new position $H_N$, so as to track the observer window 7 along the optical axis 1 depending on the observer eye positions. As a prerequisite for this, the bundle of rays in the optical path 4 is collimated in front of the tracking unit 22, seen in the direction of light propagation, or the image of the light modulator device in front of the tracking unit 22 comes from infinite distance. If this is the case, a displacement of the principal plane H along the optical axis 1 does not affect the imaging of the light modulator device on the screen 3. It must be noted though that the principal plane H' and the image-side focal length f' of the tracking unit 22 remain constant and unchanged when tracking the observer window 7. The advantage of a displacement of the principal plane H along the optical axis 1 is that the optical path 5 will change, as is illustrated with the help of the optical path 5' after the tracking. This means that when displacing the principal plane H for example against the direction of light propagation, to the left towards $H_N$, the image of the Fourier transform FT is no longer imaged to the same place either, but to another place along the optical axis 1, as can be seen clearly in this embodiment. The object-side focal point F is displaced accordingly to the left, towards $F_N$. The observer window 7 is thus imaged into an observer plane 6', i.e. it is tracked to the observer. After the tracking, a new observer window 7' is generated in the observer plane 6' behind the observer window 7, seen in the direction of light propagation. Alternatively, the principal plane H can also be displaced to the right, seen in the direction of light propagation, along the optical axis 1 in order to move the observer window 7 towards the screen 3.

An axial displacement of the principal plane H is achieved by modifying the properties of the optical system of the tracking unit 22. For example, the distances among the optical elements in the tracking unit 22 can be changed. It is also possible to change the focal length or refraction power of at least one optical element, e.g. by changing the curvature of an optical element in the form of a mirror. Further, lenses with controllable focal length, e.g. liquid lenses, may also be used as optical elements in order to displace the principal plane H.

The observer eye position is detected, as mentioned above, with the help of a position detection system 8, and the tracking unit 22, which is controlled by a control unit 9, tracks the observer window 7.

Figure 3:
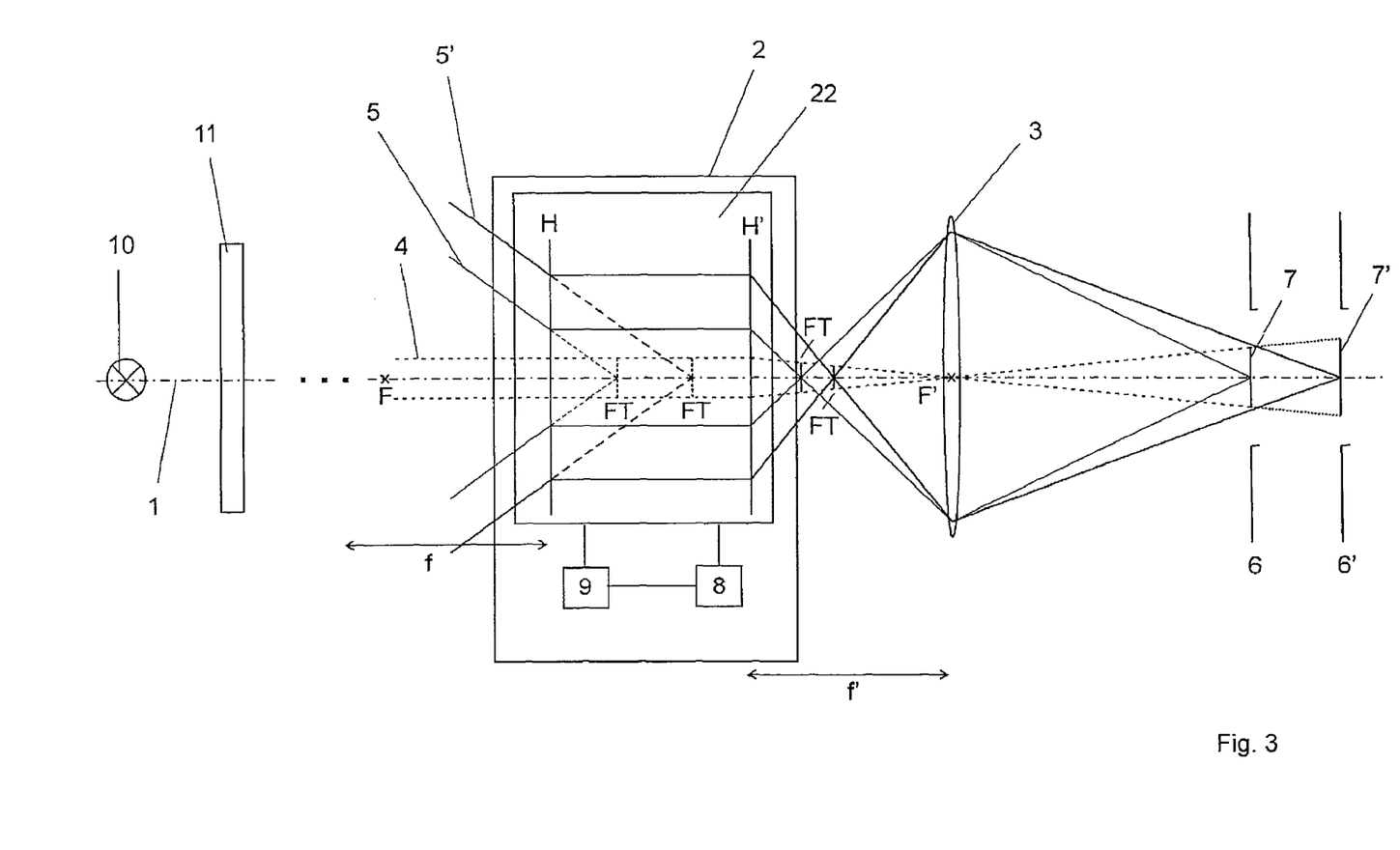
FIG. 3 shows another possibility of tracking the observer window.

FIG. 3 shows another possibility of tracking the observer window 7 along the optical axis 1. According to this embodiment, it is not the principal plane H that is displaced along the optical axis 1 of the display device, but system components which are disposed in front of the device 2, such as a light modulator device 11. The light modulator device 11 is therein illuminated by a light source 10, where both system components are disposed in front of the tracking unit 22, seen in the direction of light propagation. Further optical elements, which are used for imaging and reconstruction, are disposed in an intermediate region of the display device, which is defined by three points on the optical axis 1. However, these elements are not essential for the idea according to this invention, so that a description is omitted here. Tracking of the observer window 7 can also be achieved with the help of the procedure mentioned above. If the light modulator device 11 is displaced, the principal planes H and H' and the focal length f' remain constant during the tracking. The optical path 5 prior to the tracking and the optical path 5' after the tracking of the observer window 7 towards 7' intersect the principal plane H of the tracking unit 22 at the same position of the optical axis 1. Thanks to a displacement of components in front of the tracking unit 22, it is thus also achieved that the imaging of the Fourier transform FT is displaced along the optical axis 1 (FT to FT'). However, the light modulator device 11 is always imaged to the same place, namely on to the screen 3, as indicated by the optical path 4 represented by the broken line.

The two above-mentioned possibilities of axial tracking of the observer window 7 describe a tracking preferably without movement or enlargement of the image of the light modulator device 11 on the screen 3. As can be seen from the Figures, the dimension of the observer window 7 is proportional to the distance between the observer window 7 and the screen 3, or the dimension of the observer window 7 depends on that distance.

Figure 4:
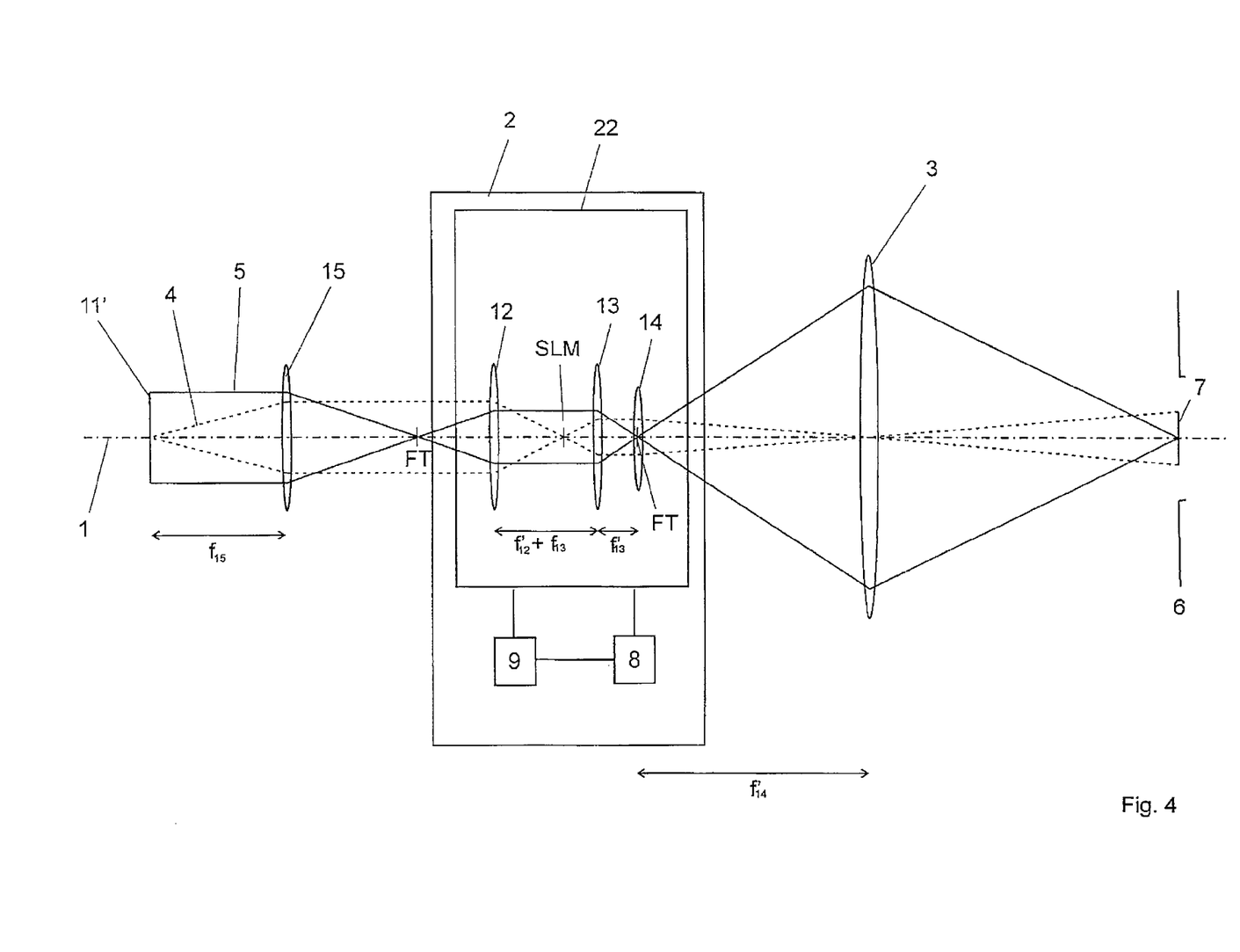
FIG. 4 is a detailed view of a tracking unit of the display device according to FIG. 1.

FIG. 4 shows the tracking unit 22 in more detail compared with FIG. 1, where it is shown as a part of the display device. This detail of the display device, in turn, only shows the device 2 in combination with the tracking unit 22, the screen 3 and an image 11' of the light modulator device 11 (not shown here). According to this embodiment, the tracking unit 22 comprises three optical elements 12, 13, 14, which may for example be lenses, mirrors or similar elements. The optical elements 12 and 13 therein form an afocal system. The optical element 14 is disposed at a focal distance $f_{13}'$ of the optical element 13. The screen 3 is disposed at the focal distance $f_{14}'$ of the optical element 14. A further optical element 15 with a focal length $f_{15}'$, which can also be a lens, mirror or similar element, is disposed in front of the tracking unit 22, seen in the direction of light propagation. Now, the functional principle of this display device is as follows. The light modulator device 11, not shown here, is illuminated with light emitted by the light source 10, and modulates this light in accordance with the hologram of a scene to be reconstructed, which is encoded on it. The light modulator device 11 is imaged by further optical elements, which are not shown here, whereby for example an image 11' of the light modulator device 11 is generated in front of the optical element 15. At the same time, a Fourier transform FT, not shown here, is generated in the display device in front of the optical element 15, seen in the direction of light propagation. The image 11' of the light modulator device 11 is then imaged by the optical element 15 into infinite distance and, by the optical element 12, into its image-side focal plane. The Fourier transform FT is thereby imaged by the optical element 15 into its focal plane, and then by the optical elements 12 and 13 of the tracking unit 22 into the image-side focal plane of the optical element 13. According to this embodiment, the optical element 14 is disposed in that plane. The screen 3, which at the same time serves as imaging means, then images the Fourier transform FT into the observer plane 6. The Fourier transform FT forms in the observer plane 6 the observer window 7, through which the observer can watch the reconstructed scene. At the same time the Fourier transform FT is imaged, the image 11' of the light modulator device 11 is imaged by the optical elements 13 and 14 from the focal plane of the optical element 12 on to the screen 3.

Figure 5:
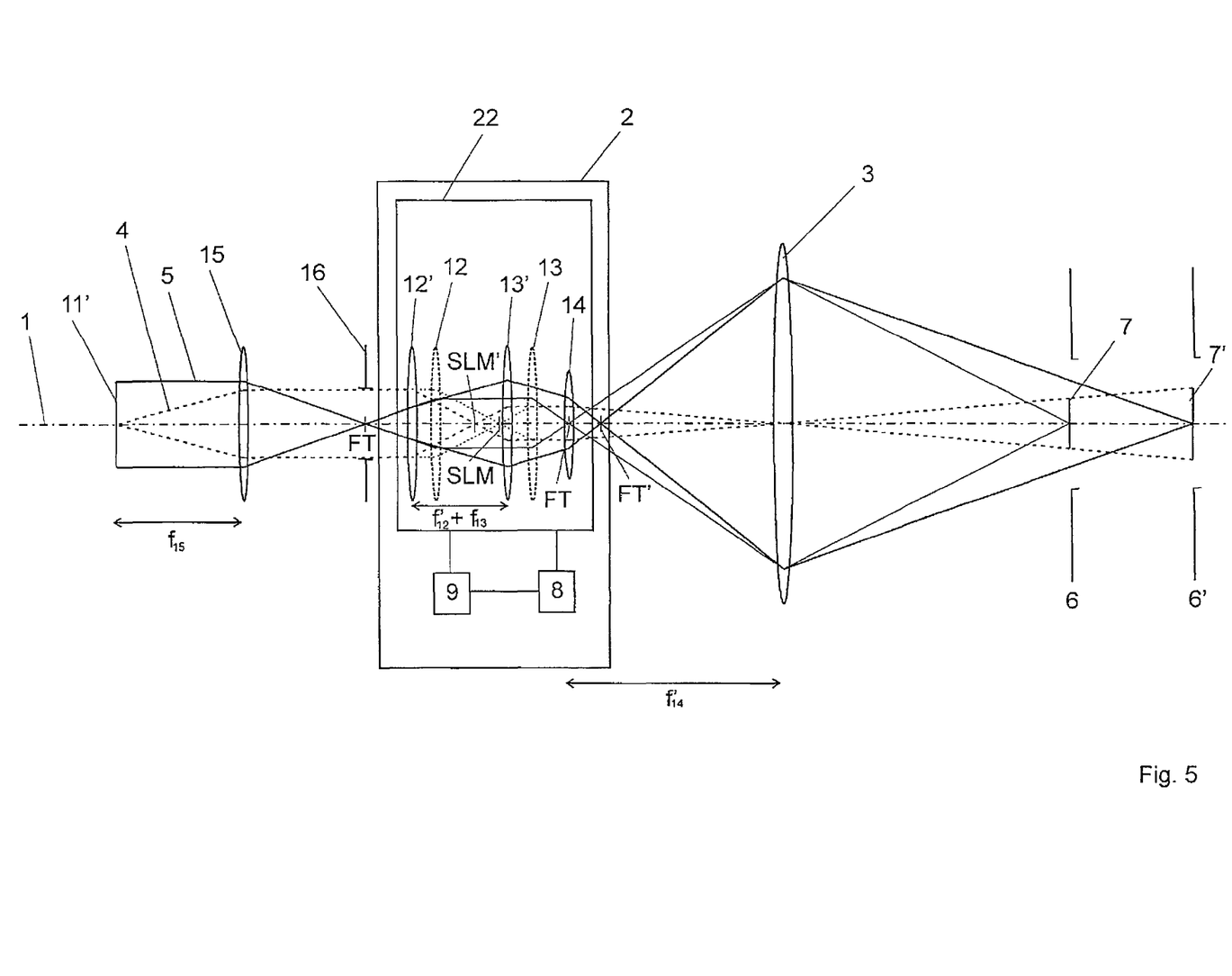
FIG. 5 is a detailed view of the tracking unit of the display device when tracking the observer window according to FIG. 2.
Figure 6:
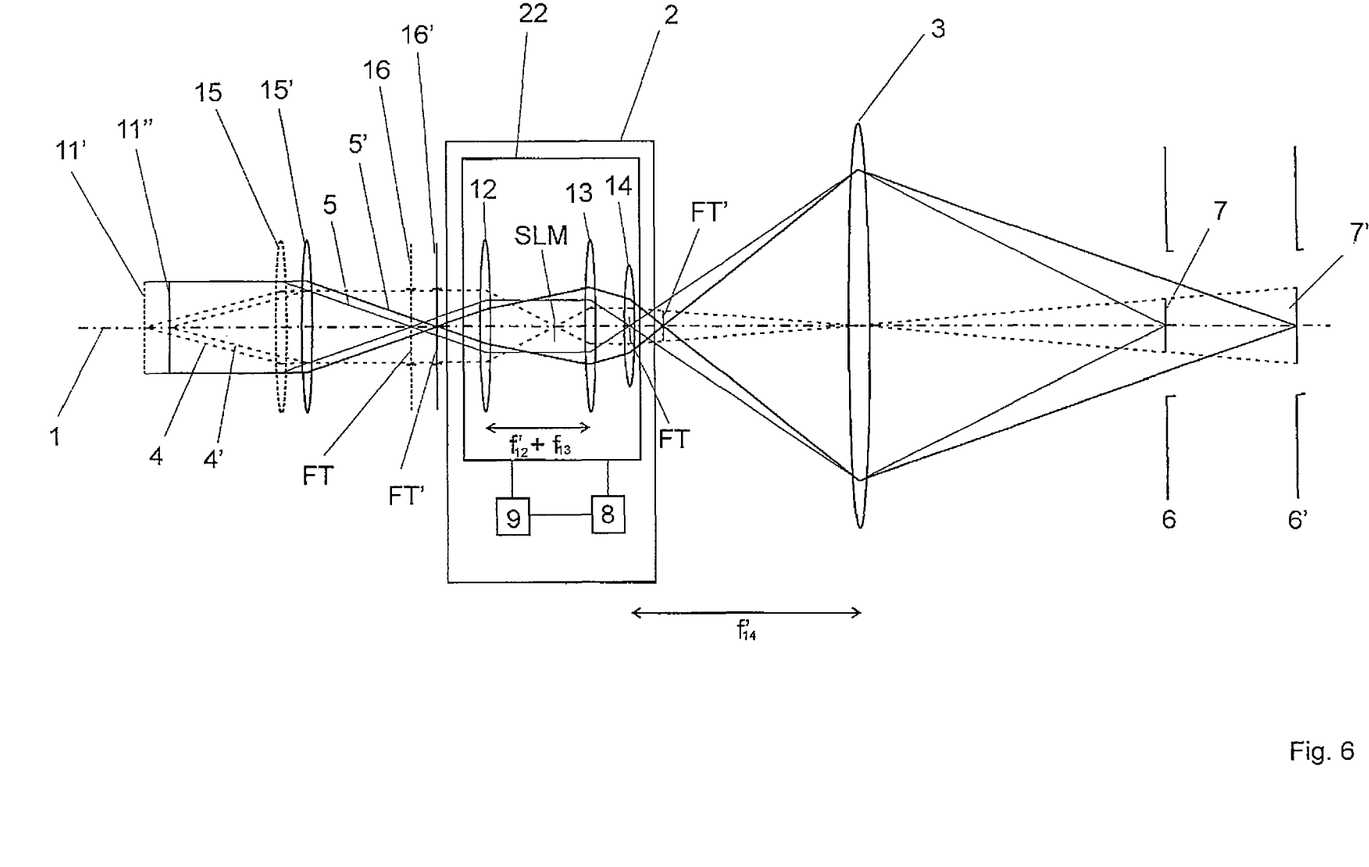
FIG. 6 is a detailed view of the tracking unit of the display device when tracking the observer window according to FIG. 3.

FIGS. 5 and 6 show in detail how the observer window 7 is tracked.

FIG. 5 shows a detail of the tracking unit 22. The general design of the display device in FIG. 5 is identical to the design of the device from FIG. 4. However, this embodiment shows how the observer window 7 is tracked along the optical axis 1. The tracking is achieved by displacing the optical elements 12 and 13 of the tracking unit 22 along the optical axis 1, here against the direction of light propagation. The new position of the optical elements 12 and 13 is indicated by the numerals 12' and 13', respectively, and the previous position of the optical elements 12 and 13 is indicated by a broken line.

This way, as described for FIG. 2, the principal plane H of the tracking unit 22 is displaced, while the focal length $f_{14}'$ and thus the principal plane H' remain constant. In this case this means that the optical element 14 must not be displaced in order to ensure that the image 11' of the light modulator device 11 is always imaged on to the screen 3. Displacing the optical elements 12 and 13 effects a displacement of the image of the light modulator device 11 within the tracking unit 22 (SLM to SLM'), and in particular a displacement of the Fourier transform FT along the optical axis 1. As the Fourier transform FT, which is imaged through the screen 3 into the observer plane 6, is displaced to the position FT', the observer window 7 will be displaced accordingly, because it is represented by that Fourier transform FT. The new observer window 7' is now situated in the new observer plane 6' according to the new observer eye position.

However, it is important that the two optical elements 12 and 13 are displaced together along the optical axis 1. This way the image of the light modulator device 11 on the screen 3 does not change.

Further, a spatial frequency filter 16 is provided in the display device, here in particular a holographic display device, said filter 16 transmitting only a selected periodicity interval of the Fourier spectrum (the spatial frequency spectrum). The spatial frequency filter 16 can have the form of an aperture, and it can be disposed between the optical elements 12 and 15, in particular in a Fourier plane, here located at the focal distance of the optical element 15. The spatial frequency filter 16 is of major importance with light modulator devices with a pixel structure, because the holograms encoded on them exhibit a periodic continuation of the Fourier spectrum in the Fourier plane. The spatial frequency filter 16 is therefore disposed in a Fourier plane in order to suppress or to eliminate the periodicity. The spatial frequency filter 16 is designed such that it only transmits the used diffraction order.

Another advantage is that the reduction of the Fourier spectrum to one diffraction order and the imaging of that diffraction order and of the spatial frequency filter 16 as an observer window prevents any cross-talking effects, which would typically occur in reconstructions when using light modulator devices with a matrix structure. This allows serving images to a left eye and a right eye of an observer one after another in a multiplexed process without cross-talking. Moreover, a multiplexed process to serve multiple persons becomes possible as well.

Another possibility of tracking the observer window 7 along the optical axis 1 is shown in FIG. 6. The display device according to this embodiment is identical to that shown in FIG. 4. According to this embodiment, it is not the two optical elements 12 and 13 which are displaced along the optical axis 1 of the display device, but the optical element 15 and the spatial frequency filter 16. The two elements 15 and 16 are therein displaced along the optical axis 1 in the direction of light propagation, whereby the observer window 7 is also displaced in the direction of light propagation. The new observer window 7' is now situated at a greater distance to the screen 3 than the observer window 7. If the observer is situated at a smaller distance to the screen 3, then it is necessary to displace the optical element 15 and the spatial frequency filter 16 against the direction of light propagation, so that the observer window 7 moves closer to the screen 3 in order for the observer eyes to be able to watch the reconstructed scene through that observer window 7.

Because the optical element 15 is displaced, the corresponding object-side focal point is displaced accordingly, whereby the image 11' of the light modulator device 11 is displaced as well. Because the image 11' is at an infinite distance, it is now imaged on to the screen 3 from another plane, which corresponds with the image 11" on the optical axis 1. The optical path which belongs to the imaging of the image 11', as shown in FIG. 6, is thus only modified in front of the optical element 15, seen in the direction of light propagation, as indicated by the two optical paths 4 and 4'. However, the two optical paths 5 and 5', which describe the imaging of the Fourier transform FT, are different, which is why the position of the imaging of the Fourier transform FT on the optical axis 1 is changed or displaced. The observer window 7 is thereby displaced as well, as described above. This way, the observer window 7 can also be tracked if the observer moves along the optical axis 1 of the display device.

It is also possible to image the light modulator device 11 into the observer plane 6 on to an observer eye, while the Fourier transform FT is imaged on to the screen 3.

Of course a lateral tracking of the observer window 7 may be provided as well for such a display device. This may require further elements and it may become necessary to modify the tracking unit 22.

With the help of the device and method according to the invention it is thus possible to provide—in addition to a lateral tracking of the exit pupil or of the observer window 7—an axial tracking if the observer moves towards the screen 3 or away from it, thereby preventing a vignetting of the reconstructed scene.

Possible applications of the device according to this invention for tracking an observer window in combination with the method include display devices, in particular holographic display devices, for a two- and/or three-dimensional presentation in private or working environments, for example computer displays, head-mounted displays, mobile phone displays, TV screens, electronic games, in the automotive industry for the display of information or entertainment content, in medical engineering and in military engineering for example for the representation of surface profiles. It will appear to those skilled in the art that the present device can also be applied in other areas not mentioned above, where it is necessary to track the exit pupil of the device.

The invention claimed is:

1. A display device for a two- and/or three-dimensional representation with at least one light source, at least one light modulator device, an optical element which serves as a screen, and a tracking system for tracking a virtual observer window in an observer plane, in which at least one observer is situated, where said tracking system comprises a position detection system for detecting the eye positions of the at least one observer in the observer plane, a tracking unit and a control unit for activating and controlling the tracking unit, and where said tracking system is disposed between the light modulator device and the optical element which serves as a screen, where for tracking the observer window along an optical axis of the display device an image-side focal length of an optical system of the tracking unit is constant, and where an image-side focal point of the optical system lies on the optical element which serves as a screen.

2. The device according to claim 1, wherein the optical system of the tracking unit comprises at least two optical elements.

3. The device according to claim 1, wherein a spatial frequency filter is disposed in a plane in which the Fourier spectrum of the light modulator device of the display device lies.

4. The device according to claim 3, wherein the spatial frequency filter is disposed in front of the tracking unit, seen in the direction of light propagation.

5. The device according to claim 1, wherein the size of the observer window depends on the distance between the observer plane and the optical element which serves as a screen.

6. A method for tracking at least one virtual observer window in an observer plane in which at least one observer is situated, when the observer changes his position, said method being implemented using a display device that includes:
   at least one light source;
   at least one light modulator device;
   an optical element which serves as a screen; and
   a tracking system tracking a virtual observer window in an observer plane in which at least one observer is situated, said tracking system comprising:
      a position detection system detecting eye positions of the at least one observer in the observer plane;
      a tracking unit; and
      a control unit activating and controlling the tracking unit, said tracking system being disposed between the light modulator device and the optical element;

and said method comprising the steps of:
   detection of eye positions of the at least one observer in the observer plane by a position detection system,
   transfer of the detected values to said control unit,
   activation of said tracking unit by said control unit,
   tracking of the at least one virtual observer window along an optical axis of said tracking system by said tracking unit, such that an image-side focal length of an optical system of said tracking unit remains unchanged, and where a bundle of rays falls onto said tracking unit in a collimated way.

7. The method according to claim 6, wherein for tracking the observer window properties of the tracking unit, in particular focal length and distance among the individual optical elements, are changed such that an object-side main plane of the optical system of the tracking unit is displaced along the optical axis.

8. The method according to claim 6, wherein for tracking the observer window at least one light modulator device is displaced along the optical axis in combination with an optical element in the display device.

9. The method according to claim 6, wherein the light modulator device is imaged on to an optical element which serves as a screen.

10. The method according to claim 6, wherein a Fourier transform of a hologram on the light modulator device is imaged on to at least one eye of the observer, where it forms the observer window.

11. The method according to claim 6, wherein a spatial frequency filter, which is disposed in a Fourier plane of the display device, transmits a selected periodicity interval of the Fourier spectrum of a hologram.

12. The method according to claim 6, wherein for tracking the observer window an image of the light modulator device, the optical element, which is disposed between the image of the light modulator device and the spatial frequency filter, and the spatial frequency filter itself are displaced together.

13. The method according to claim 8 wherein the light modulator device is imaged on to an optical element which serves as a screen.

14. The method according to claim 8 wherein a Fourier transform of a hologram on the light modulator device is imaged on to at least one eye of the observer, where it forms the observer window.

15. The method according to claim 11, wherein for tracking the observer window an image of the light modulator device, the optical element, which is disposed between the image of the light modulator device and the spatial frequency filter, and the spatial frequency filter itself are displaced together.

* * * * *